(12) United States Patent
Wei

(10) Patent No.: US 11,281,065 B2
(45) Date of Patent: Mar. 22, 2022

(54) DISPLAY PANEL ASSEMBLY AND DISPLAY METHOD THEREOF

(71) Applicant: BOE TECHNOLOGY GROUP CO., LTD., Beijing (CN)

(72) Inventor: Wei Wei, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 428 days.

(21) Appl. No.: 16/336,743

(22) PCT Filed: Sep. 5, 2018

(86) PCT No.: PCT/CN2018/104169
§ 371 (c)(1),
(2) Date: Mar. 26, 2019

(87) PCT Pub. No.: WO2019/047851
PCT Pub. Date: Mar. 14, 2019

(65) Prior Publication Data
US 2021/0294116 A1  Sep. 23, 2021

(30) Foreign Application Priority Data
Sep. 6, 2017  (CN) .......................... 201710795314.9

(51) Int. Cl.
*G02F 1/155* (2006.01)
*G02B 30/31* (2020.01)

(52) U.S. Cl.
CPC ............. *G02F 1/155* (2013.01); *G02B 30/31* (2020.01)

(58) Field of Classification Search
CPC .. G02B 30/25; G02B 30/31-33; G02B 30/26; G02B 26/00; G02F 1/061;
(Continued)

(56) References Cited

U.S. PATENT DOCUMENTS 9,316,844 B2   4/2016  Li et al.
10,146,059 B2  12/2018 Guo et al.
(Continued)

FOREIGN PATENT DOCUMENTS

CN  102436100 A   5/2012
CN  102778757 A  11/2012
(Continued)

OTHER PUBLICATIONS

Translation of CN 103995412 (Aug. 20, 2014) obtained using proquest.*
(Continued)

*Primary Examiner* — Kristina M Deherrera
(74) *Attorney, Agent, or Firm* — Nath, Goldberg & Meyer; Joshua B. Goldberg

(57) ABSTRACT

The present disclosure provides a display panel assembly. The display panel assembly includes a display panel and a display switching device on a light outgoing surface of the display panel. The display switching device includes an electrode group and an electrochromic layer. The electrode group includes a first electrode and a second electrode. The first electrode and the second electrode are configured to receive voltage signals such that the electrochromic layer presents one of a transparent state for 2D display, a first pattern for auxiliary 3D display, or a second pattern for glasses-free 3D display.

17 Claims, 6 Drawing Sheets

(58) Field of Classification Search
CPC ........ G02F 1/167; G02F 1/155; G02F 1/1323; H04N 13/359; H04N 13/31; H04N 13/356
USPC ........................................................ 359/265
See application file for complete search history.

(56) References Cited

U.S. PATENT DOCUMENTS

| | | |
|---|---|---|
| 2008/0316597 A1 | 12/2008 | Tsai et al. |
| 2012/0127572 A1 | 5/2012 | Takahashi et al. |
| 2012/0170115 A1 | 7/2012 | Zhang et al. |
| 2013/0201084 A1 | 8/2013 | Wang et al. |
| 2015/0077665 A1 | 3/2015 | Li et al. |
| 2017/0048516 A1 | 2/2017 | Yang et al. |

FOREIGN PATENT DOCUMENTS

| | | |
|---|---|---|
| CN | 103246072 A | 8/2013 |
| CN | 103984107 A | 8/2014 |
| CN | 103995412 A | 8/2014 |

OTHER PUBLICATIONS

First Office Action dated Jan. 6, 2020, for corresponding Chinese application 201710795314.9.
International Search Report; Application No. PCT/CN2018/104169; dated Nov. 15, 2018; English Translation Attached.
Extended European Search Report dated May 7, 2021 for application No. EP18854587.5.

\* cited by examiner

DISPLAY PANEL ASSEMBLY AND DISPLAY METHOD THEREOF

CROSS-REFERENCE TO RELATED APPLICATION

This is a National Phase Application filed under 35 U.S.C. 371 as a national stage of PCT/CN2018/104169, filed on Sep. 5, 2018, an application claiming the benefit of priority to Chinese Patent Application No. 201710795314. 9 filed on Sep. 6, 2017, the contents of which are incorporated herein in their entirety by reference.

TECHNICAL FIELD

The present disclosure belongs to the field of display technology, and in particular, to a display panel assembly and a display method thereof.

BACKGROUND

With the continuous development of display technology, 3D display, which can make pictures more realistic and give a user an immersive feeling, has become an important development trend in the display field.

The 3D display includes a glasses-free 3D display and an auxiliary 3D display (i.e., a technique of implementing 3D display by means of an auxiliary viewing device such as 3D glasses). The glasses-free 3D display does not require a viewer to wear the corresponding glasses, but has relative large crosstalk and limited depth of field. The auxiliary 3D display has good visual effects, but it is necessary to design a corresponding display panel. This display panel has high cost and long development cycle, which is not conducive to application of the product in various fields.

SUMMARY

The present disclosure provides a display panel assembly and a display method thereof.

The display panel assembly according to the present disclosure includes a display panel and a display switching device on a light outgoing surface of the display panel, wherein the display switching device includes an electrode group and an electrochromic layer; the electrode group includes a first electrode and a second electrode; and the first electrode and the second electrode are configured to make the electrochromic layer present one of a transparent state for 2D display, a first pattern for auxiliary 3D display, or a second pattern for glasses-free 3D display.

In an embodiment, the display panel assembly further includes a phase retardation film, and the display switching device is on a light outgoing side of the phase retardation film.

In an embodiment, the display panel assembly further includes a common electrode, the electrochromic layer is between the electrode group and the common electrode, and the electrochromic layer is configured to:

present the transparent state to achieve 2D display in response a first electric field between the electrode group and the common electrode;

present the first pattern to achieve auxiliary 3D display in response to a second electric field between the first electrode and the common electrode; and present the second pattern to achieve glasses-free 3D display in response to a third electric field between the second electrode and the common electrode.

In an embodiment, the first pattern includes blocking strips extending in a first direction, and the second pattern includes blocking strips extending in a second direction, the first direction intersecting the second direction.

In an embodiment, the electrochromic layer is made of an electrochromic material, the electrochromic material turns black in response to the second electric field between the first electrode and the common electrode, and the electrochromic material turns black in response to the third electric field between the second electrode and the common electrode.

In an embodiment, the display switching device includes: a first substrate and a second substrate, the first substrate includes the first electrode, a first common electrode, and a first insulating layer between the first electrode and the first common electrode, the second substrate includes the second electrode, a second common electrode, and a second insulating layer between the second electrode and the second common electrode, and the electrochromic layer is between the first substrate and the second substrate.

In an embodiment, in response to the first electric field between the first substrate and the second substrate, the electrochromic layer presents the transparent state to achieve 2D display; in response to the second electric field between the first electrode and the second common electrode, the electrochromic layer presents the first pattern to achieve auxiliary 3D display; and in response to the third electric field between the second electrode and the first common electrode, the electrochromic layer presents the second pattern to achieve glasses-free 3D display.

In an embodiment, the first electrode includes a plurality of strip electrodes, the plurality of strip electrodes extend in a first direction and are closely arranged, the second electrode includes a plurality of strip electrodes, the plurality of strip electrodes extend in a second direction and are closely arranged, and the electrochromic layer is between the first electrode and the second electrode.

In an embodiment, in response to a first electric field generated between the first electrode and the second electrode, the electrochromic layer presents the transparent state to achieve 2D display; in response to a second electric field generated between the first electrode and the second electrode, the electrochromic layer presents the first pattern to achieve auxiliary 3D display; in response to a third electric field generated between the first electrode and the second electrode, the electrochromic layer presents the second pattern to achieve glasses-free 3D display.

In an embodiment, the electrode group and the common electrode are each made of a transparent electrode material.

In an embodiment, the electrochromic layer is made of an electrochromic material.

In an embodiment, an orthographic projection of the first electrode on the display panel and an orthographic projection of the second electrode on the display panel both are within an orthographic projection of the common electrode on the display panel.

In an embodiment, the first electrode includes a plurality of strip electrodes extending in the first direction, and the second electrode includes a plurality of strip electrodes extending in the second direction.

In an embodiment, the first direction is perpendicular to the second direction.

In an embodiment, the display panel includes a color filter substrate, the display switching device is on a light outgoing surface of the color filter substrate, a black matrix is provided on a light incident surface of the color filter substrate, the black matrix includes a black matrix extending in the first direction and a black matrix extending in the second direction, the black matrix extending in the first direction intersects the black matrix extending in the second direction, and the color filter substrate is provided with a color filter in a space defined by the black matrix.

In an embodiment, the blocking strips extending in the first direction are in one-to-one correspondence with the black matrix extending in the first direction, and the blocking strips extending in the second direction are in one-to-one correspondence with the black matrix extending in the second direction.

In an embodiment, a width of the blocking strips extending in the first direction is greater than a width of the black matrix extending in the first direction, and a width of the blocking strips extending in the second direction is greater than a width of the black matrix extending in the second direction.

In an embodiment, the display panel assembly further includes a polarizer, and the phase retardation film is on a side of the polarizer close to the display switching device.

In an embodiment, an insulating layer is provided between the first electrode and the second electrode.

In an embodiment, the common electrode is an integral layer of electrode.

In an embodiment, the display panel includes an OLED display panel.

The present disclosure also provides a display method of a display panel assembly, including steps of:

inputting display content to the display panel;

determining format of the display content; and controlling a voltage signal applied to the electrode group based on a result of the determining step to control the electrochromic layer to present one of a transparent state for 2D display, a first pattern for auxiliary 3D display, or a second pattern for glasses-free 3D display.

In an embodiment, in response to the display content being 2D display content, a first voltage signal is applied to the electrode group, such that the electrochromic layer presents the transparent state and the display panel displays a 2D image;

in response to the display content being auxiliary 3D display content, a second voltage signal is applied to the electrode group, such that the electrochromic layer forms blocking strips extending in a first direction, and the display panel displays an auxiliary 3D display image; and in response to the display content being glasses-free 3D display content, a third voltage signal is applied to the electrode group, such that the electrochromic layer forms blocking strips extending in a second direction, and the display panel displays a glasses-free 3D display image.

DETAILED DESCRIPTION

To make those skilled in the art better understand the technical solutions of the present disclosure, the present disclosure will be further described in detail below in conjunction with the accompanying drawings and the specific implementations.

The present disclosure provides a display panel assembly and a display method thereof, which are intended to realize switching between 2D display, auxiliary 3D display, and glasses-free 3D display to meet viewing requirements on different occasions.

Figure 1:
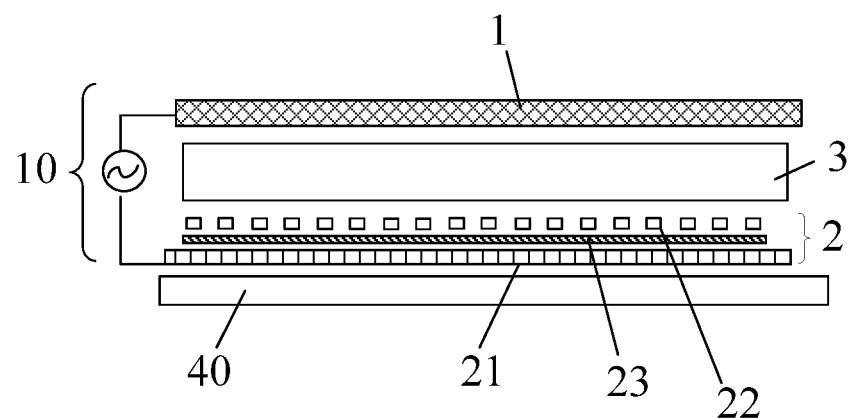
FIG. 1 is a schematic structural diagram of a display panel assembly according to an embodiment of the present disclosure.

FIG. 1 is a schematic structural diagram of a display panel assembly according to an embodiment of the present disclosure. As shown in FIG. 1, the display panel assembly includes a display panel 40 and a display switching device 10 disposed on a light outgoing surface of the display panel. The display switching device 10 includes an electrode group 2, a common electrode 1, and an electrochromic layer 3 disposed between the electrode group 2 and the common electrode 1. The electrode group 2 includes a first electrode 21 and a second electrode 22. In an embodiment, an insulating layer 23 is provided between the first electrode 21 and the second electrode 22. The electrode group 2 and the common electrode 1 are configured to receive voltage signals such that the electrochromic layer 3 presents one of a transparent state for 2D display, a first pattern for auxiliary 3D display, or a second pattern for glasses-free 3D display.

Referring to FIG. 1, the display switching device 10 is disposed on the light outgoing surface of the display panel 40. The display switching device 10 includes, from top to bottom, the common electrode 1, the electrochromic layer 3, and the electrode group 2 including the first electrode 21 and the second electrode 22. The insulating layer 23 is disposed between the first electrode 21 and the second electrode 22 so that the first electrode 21 and the second electrode 22 are insulated from each other.

The display switching device according to an embodiment of the present disclosure controls the electrochromic layer 3 to form different patterns by controlling voltage signals applied to the electrode group 2 and the common electrode 1. In some embodiments, the electrode group 2 includes a first electrode 21 and a second electrode 22 that may be paired with the common electrode 1. In some embodiments, the electrode group 2 and the common electrode 1 are configured to perform one of the following: generating a first electric field between the electrode group 2 and the common electrode 1, such that the electrochromic layer 3 presents the transparent state to achieve 2D display; generating a second electric field between the first electrode 21 and the common electrode 1, such that the electrochromic layer 3 presents the first pattern to achieve auxiliary 3D display; and generating a third electric field between the second electrode 22 and the common electrode 1, such that the electrochromic layer 3 presents the second pattern to achieve glasses-free 3D display. When the display panel assembly is operated to display, in a case where no voltage signal is applied between the electrode group 2 and the common electrode 1, the electrochromic layer 3 is in the transparent state, thereby realizing 2D display; in a case where a first voltage signal is applied between the common electrode 1 and the first electrode 21, the electrochromic layer 3 forms the first pattern, thereby achieving auxiliary 3D display; in a case where a second voltage signal is applied between the common electrode 1 and the second electrode 22, the electrochromic layer 3 forms the second pattern, thereby achieving glasses-frees 3D display. In this way, switching between 2D display, auxiliary 3D display, and glasses-free 3D display can be realized, thereby satisfying the viewing requirements on different occasions. It can be understood that the way to make the electrochromic layer 3 in the transparent state is not limited to the absence of a voltage signal between the electrode group 2 and the common electrode 1, and the electrochromic layer 3 may be made in a transparent state by applying a corresponding voltage signal between the electrode group 2 and the common electrode 1 based on the material of the electrochromic layer.

In some embodiments of the present disclosure, the electrode group 2 and the common electrode 1 are each made of a transparent electrode material.

That is to say, both the electrode group 2 and the common electrode 1 in the display switching device may be transparent electrodes. For example, the electrode group 2 and the common electrode 1 may be made of a material such as indium tin oxide ITO or indium zinc oxide IZO. In the present embodiment, the electrode group 2 and the common electrode 1 made of a transparent material do not affect the aperture ratio of the display product.

Figure 9:
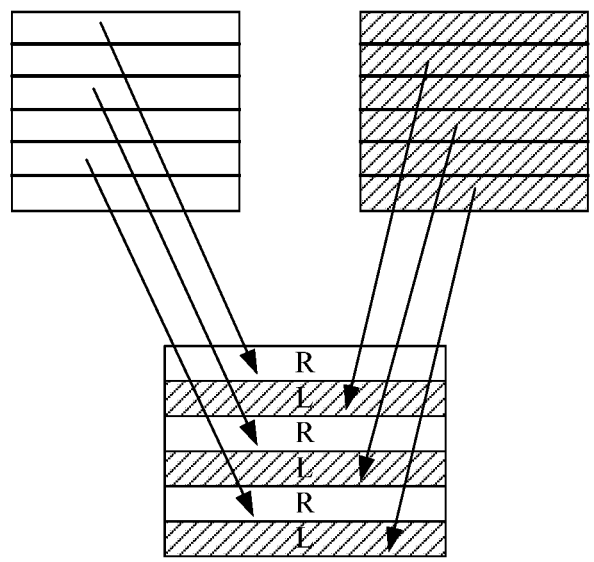
FIGS. 9 and 10 are schematic diagrams illustrating a display principle of a display panel assembly according to an embodiment of the present disclosure.

FIG. 9 is a schematic diagram illustrating a principle of auxiliary 3D display performed by a display panel assembly according to an embodiment of the present disclosure. During auxiliary 3D display, the first voltage signal between the common electrode 1 and the first electrode 21 causes the electrochromic layer 3 to form blocking strips extending in a first direction, and the blocking strips extending in the first direction serve as a lateral grating, which cooperates with an auxiliary viewing device (e.g., corresponding 3D glasses) to present a clear 3D image in left and right eyes of a person, achieving an auxiliary 3D display of the display device. As shown in FIG. 9, a left-eye image L and a right-eye image R are horizontally interleaved to achieve auxiliary 3D display. In this case, by adjusting the first voltage signal between the common electrode 1 and the first electrode 21, the width of the lateral grating is controlled, so that the viewing angle of the auxiliary 3D display can be controlled. It can be understood that the larger the width of the lateral grating, the larger the viewing angle of the auxiliary 3D display. A larger viewing angle can be achieved compared to conventional auxiliary 3D display. In addition, since the viewing angle of the auxiliary 3D display can be controlled by adjusting the first voltage signal between the common electrode 1 and the first electrode 21, the viewing angle of the auxiliary 3D display can be reduced by adjusting the first voltage signal in a case that a small viewing angle can satisfy the viewing demand, and the viewing angle of the auxiliary 3D display can be enlarged by adjusting the first voltage signal in a case that a large viewing angle is needed, thereby achieving the effect of reducing the power consumption.

Figure 10:
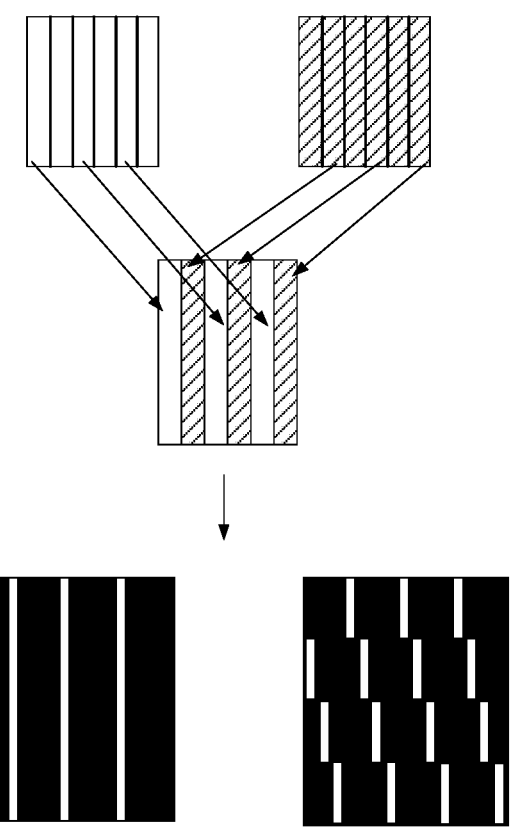

FIG. 10 is a schematic diagram illustrating a principle of glasses-free 3D display performed by a display panel assembly according to an embodiment of the present disclosure. During glasses-free 3D display, the second voltage signal between the common electrode 1 and the second electrode 22 causes the electrochromic layer 3 to form blocking strips extending in a second direction, and the blocking strips extending in the second direction serve as a vertical grating or an oblique grating (see the lower part of FIG. 10) to achieve glasses-free 3D display of the display device. As shown in the upper part of FIG. 10, a left-eye image and a right-eye image are vertically interleaved to achieve glasses-free 3D display. In this case, by adjusting the second voltage signal between the common electrode 1 and the second electrode 22, the width of the vertical grating or the oblique grating is controlled, so that the viewing angle of the glasses-free 3D display can be controlled.

It can be understood that it is also possible to apply no voltage between the common electrode 1 and the first electrode 21 during auxiliary 3D display. In this case, the electrochromic layer 3 exhibits the transparent state, but such an auxiliary 3D display has a small viewing angle, which is not conducive to viewing.

As an optional implementation in the embodiment, the first electrode 21 includes a plurality of strip electrodes extending in the first direction, and the second electrode 22 includes a plurality of strip electrodes extending in the second direction. The angle between the first direction and the second direction is greater than zero.

In an embodiment, the first direction and the second direction are perpendicular to each other.

Figure 2:
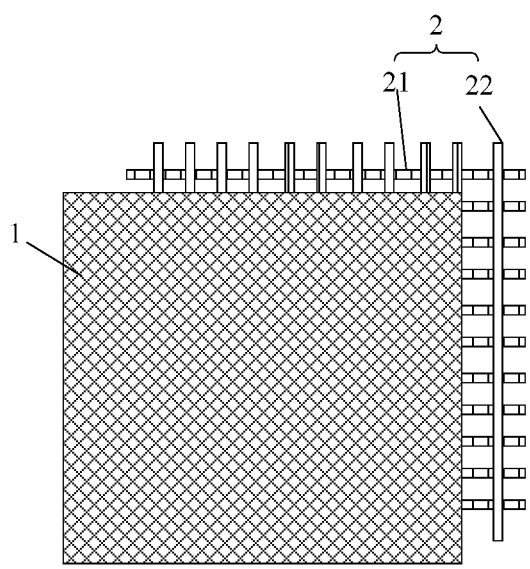
FIG. 2 is a schematic diagram illustrating a common electrode and an electrode group in a display panel assembly according to an embodiment of the present disclosure.
Figure 3:
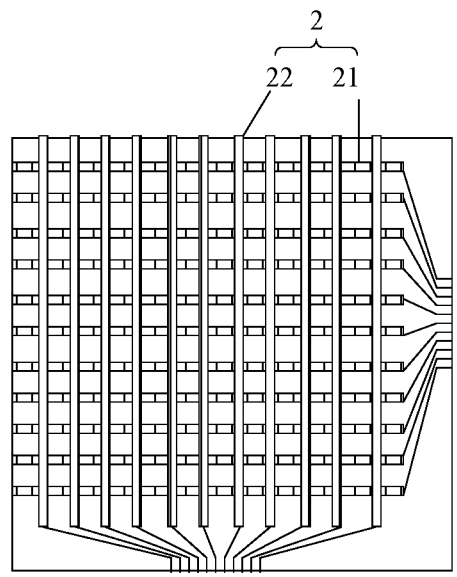
FIG. 3 is a schematic structural diagram of an electrode group in a display panel assembly according to an embodiment of the present disclosure.

FIG. 2 is a schematic diagram illustrating a common electrode and an electrode group in a display panel assembly according to an embodiment of the present disclosure. As shown in FIG. 2, the common electrode 1 is an integral layer of electrode, and the electrode group 2 includes horizontal electrode strips and vertical electrode strips which are perpendicular to each other. FIG. 3 is a schematic structural diagram of an electrode group in a display panel assembly according to an embodiment of the present disclosure. As shown in FIG. 3, the horizontal electrodes (i.e., the first electrode 21) of the electrode group 2 are each bonded to a first chip, and the first chip supplies signals to the horizontal first electrode 21; the vertical electrodes (i.e., the second electrode 22) of the electrode group 2 is bonded to a second chip, and the second chip supplies signals to the vertical second electrode 22. FIGS. 2 and 3 illustrate the case that the first electrode 21 and the second electrode 22 are perpendicular to each other, and it can be understood that the case that an angle between the first electrode 21 and the second electrode 22 is not 90° is similar thereto, and will not be described here.

In one embodiment, an orthographic projection of the first electrode 21 on the display panel 40 and an orthographic projection of the second electrode 22 on the display panel 40 both fall within an orthographic projection of the common electrode 1 on the display panel 40.

When voltages are applied to the first electrode 21 and the common electrode 1, the electrochromic layer 3 forms blocking strips extending in the first direction; when voltages are applied to the second electrode 22 and the common electrode 1, the electrochromic layer 3 forms blocking strips extending in the second direction; the orthographic projection of the first electrode 21 on the display panel 40 and the orthographic projection of the second electrode 22 on the display panel 40 both fall within the orthographic projection of the common electrode 1 on the display panel 40. In this way, the common electrode 1 can not only form an electric field with the first electrode 21 but also form an electric field with the second electrode 22.

In an embodiment according to the present disclosure, the electrochromic layer 3 is made of an electrochromic material. The electrochromic material in the embodiments of the present disclosure refers to a material whose optical property (reflectivity, transmittance, absorptivity, etc.) undergoes a stable and reversible color change (reversible change in color and transparency in appearance) under the action of an externally-applied electric field. A material having electrochromic property is referred to as an electrochromic material. Typically, the electrochromic material includes inorganic and organic electrochromic materials. For example, the electrochromic material may include polythiophenes and derivatives thereof, viologen, tetrathiafulvalene, metal phthalocyanine compounds, and the like.

As an alternative implementation in this embodiment, the electrochromic material turns black in response to a second electric field formed between the first electrode 21 and the common electrode 1, and the electrochromic material turns black in response to a third electric field formed between the second electrode 22 and the common electrode 1.

In order to enable the display panel assembly applied to the display device to better realize the switching between 2D display, auxiliary 3D display, and glasses-free 3D display to meet the viewing requirements on different occasions, an electrochromic material that can turn a deep color after power up may be selected. For example, a material that can turn dark purple after power up may be selected. Alternatively, a material that can turn black after power up is selected.

Figure 4A:
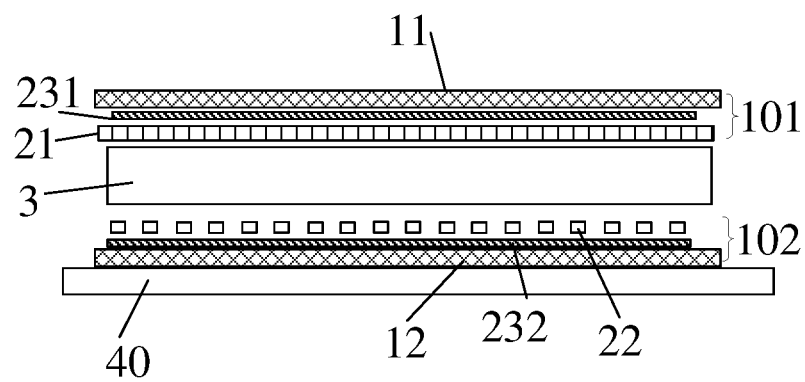
FIG. 4a is a schematic structural diagram of a display panel assembly according to an embodiment of the present disclosure.

According to another embodiment of the present disclosure, a display panel assembly includes a display panel 40 and a display switching device 10 disposed on a light outgoing surface of the display panel. The display switching device 10 includes an electrode group 2 and an electrochromic layer 3. The electrode group 2 includes a first electrode 21 and a second electrode 22. As shown in FIG. 4a, the display switching device 10 includes a first substrate 101 and a second substrate 102, the first substrate 101 includes a first electrode 21, a first common electrode 11, and a first insulating layer 231 between the first electrode 21 and the first common electrode 11, the second substrate 102 includes a second electrode 22, a second common electrode 12 and a second insulating layer 232 between the second electrode 22 and the second common electrode 12, and the electrochromic layer 3 is located between the first substrate 101 and the second substrate 102.

In response to a first electric field formed between the first substrate and the second substrate, the electrochromic layer 3 presents a transparent state to achieve 2D display; in response to a second electric field formed between the first electrode 21 and the second common electrode 12, the electrochromic layer 3 presents a first pattern to achieve auxiliary 3D display; in response to a third electric field formed between the second electrode 22 and the first common electrode 11, the electrochromic layer 3 presents a second pattern to achieve glasses-free 3D display.

Figure 4B:
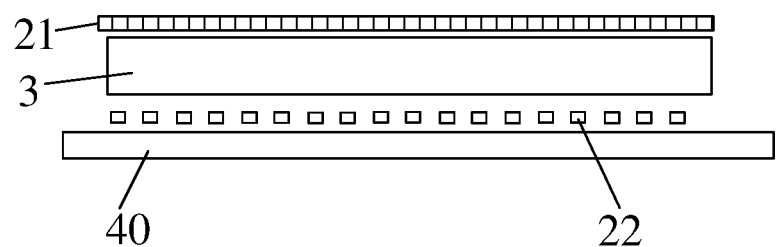

According to still another embodiment of the present disclosure, a display panel assembly includes a display panel 40 and a display switching device 10 disposed on a light outgoing surface of the display panel. The display switching device 10 includes an electrode group 2 and an electrochromic layer 3. As shown in FIG. 4b, the electrode group 2 includes a first electrode 21 and a second electrode 22. The first electrode 21 includes a plurality of strip electrodes extending in a first direction and closely arranged, and the second electrode 22 includes a plurality of strip electrodes extending in a second direction and closely arranged, and the electrochromic layer 3 is disposed between the first electrode 21 and the second electrode 22. For example, an interval between adjacent two of the closely arranged strip electrodes may be about 2 mm.

In response to a first electric field formed between the first electrode 21 and the second electrode 22, the electrochromic layer 3 presents the transparent state to achieve 2D display; in response to a second electric field formed between the first electrode 21 and the second electrode 22, the electrochromic layer 3 presents the first pattern to achieve auxiliary 3D display; in response to a third electric field formed between the first electrode 21 and the second electrode 22, the electrochromic layer 3 presents the second pattern to achieve glasses-free 3D display.

For example, when voltage signals are applied to part of strip electrodes extending in the first direction and voltage signals are applied to all of the strip electrodes extending in the second direction, since all the strip electrodes extending in the second direction are closely arranged, the strip electrodes extending in the second direction may function as a planar electrode, so that the electrochromic layer 3 can form blocking strips extending in the first direction. When voltage signals are applied to part of the strip electrodes extending in the second direction and voltage signals are applied to all of the strip electrodes extending in the first direction, since all the strip electrodes extending in the first direction are closely arranged, the strip electrodes extending in the first direction may function as a planar electrode, so that the electrochromic layer 3 can form blocking strips extending in the second direction.

Figure 5:
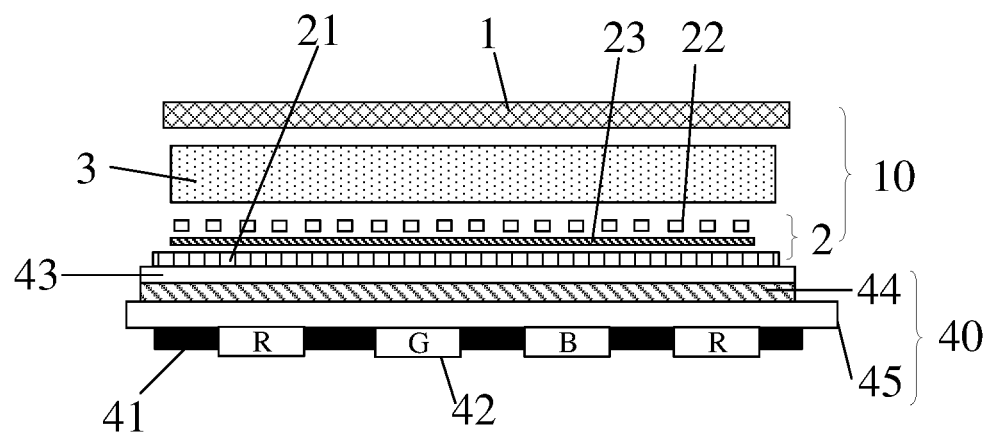
FIGS. 5 to 6 are schematic structural diagrams of a display panel assembly according to embodiments of the present disclosure.
Figure 6:
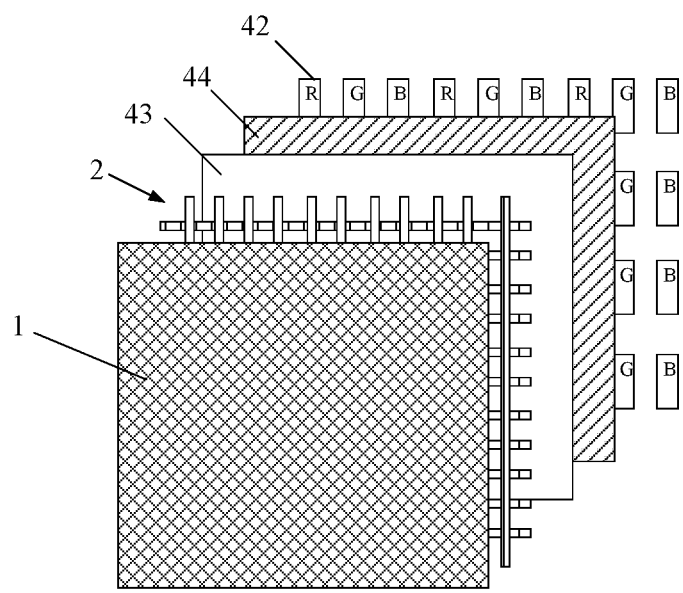

FIGS. 5 to 6 are schematic structural diagrams of a display panel assembly according to embodiments of the present disclosure. As shown in FIG. 5, the display panel 40 includes a color filter substrate 45, the display switching device 10 is disposed on the light outgoing surface of the color filter substrate, a black matrix 41 having a portion extending in the first direction and a portion extending in the second direction and intersecting the portion extending in the first direction is provided on a light incident surface of the color filter substrate, and a color filter 42 is provided in a region defined by the black matrix on the light incident surface of the color filter substrate. In order to meet the optical principle requirements of 3D imaging, in an embodiment, the portion of the black matrix 41 extending in the first direction is disposed in one-to-one correspondence with the blocking strips extending in the first direction, and the portion of the black matrix 41 extending in the second direction is disposed in one-to-one correspondence with the blocking strips extending in the second direction.

The display switching device 10 is formed on the color filter substrate to realize the corresponding switching function between 2D display, auxiliary 3D display, and glasses-free 3D display.

In one embodiment, a width of the blocking strips extending in the first direction is greater than a width of the portion of the black matrix 41 extending in the first direction, and a width of the blocking strips extending in the second direction is greater than a width of the portion of the black matrix 41 extending in the second direction. In an embodiment, a width of an orthographic projection of the blocking strips extending in the first direction on a base substrate of the color filter substrate is greater than a width of an orthographic projection of the corresponding portion of the black matrix 41 on the base substrate of the color filter substrate, and a width of an orthographic projection of the blocking strips extending in the second direction on the base substrate of the color filter substrate is greater than a width of an orthographic projection of the corresponding portion of the black matrix 41 on the base substrate of the color filter substrate. In this way, the effect of increasing the viewing angle can be achieved compared to the case where the blocking strips are not formed.

Signals may be applied to the first electrode 21 at the position of the portion of the black matrix 41 extending in the first direction to enlarge the viewing angle and achieve auxiliary 3D display; signals may be applied to the second electrode 22 at the position of the portion of the black matrix 41 extending in the second direction to achieve glasses-free 3D display.

In some embodiments, as shown in FIG. 6, a phase retardation film 43 and a polarizer 44 are disposed on the light outgoing surface of the color filter substrate, and the phase retardation film 43 and the polarizer 44 are disposed between the display switching device 10 and the color filter substrate. In an embodiment, the phase retardation film 43 is disposed closer to the display switching device 10 than the polarizer 44. By combining a phase retardation film and a bi-directionally controlled electrochromic device, mutual switching between glasses-free 3D display, auxiliary 3D display, and 2D display can be achieved.

Figure 7:
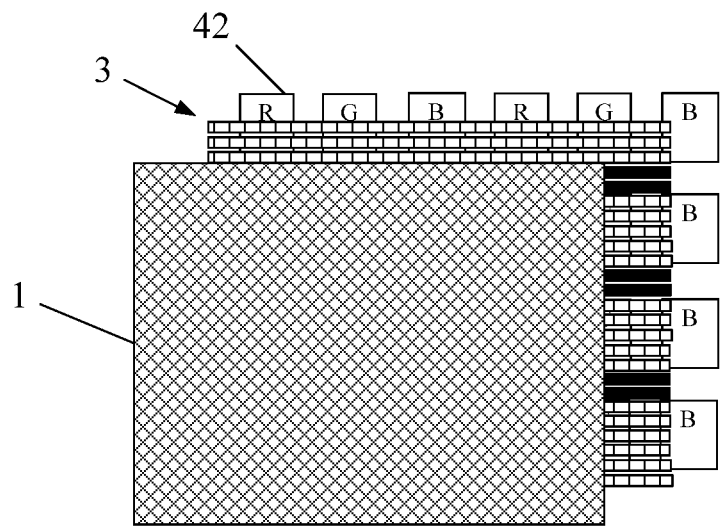
FIGS. 7 and 8 are schematic structural diagrams of a display panel assembly in different display states according to embodiments of the present disclosure.

The positional relationship between the electrode group 2, the common electrode 1, the phase retardation film 43, the polarizer 44 and the color filter 42 is shown in FIGS. 6 and 7 corresponding to the present embodiment. In the embodiment, the phase retardation film 43 is a positive or negative quarter-wavelength (¼ λ) phase retardation film and is precisely aligned with the color filter 42. In some embodiments, the phase retardation film 43 includes odd-numbered rows and even-numbered rows alternately arranged in the longitudinal direction, a length of each of the odd-numbered rows and the even-numbered rows in the longitudinal direction are equal to a length of a pixel in the color filter 42 in the longitudinal direction, and boundary lines between the odd-numbered rows and the even-numbered rows are aligned with center lines of a portion of the black matrix between two rows of pixels. It should be noted that, in the case that the display panel in the present disclosure receives 3D display data, the odd-numbered rows and the even-numbered rows of the phase retardation film 43 can respectively exhibit different polarization states, and then cooperate with polarized glasses to realize auxiliary 3D display.

In one embodiment, the display panel includes an OLED display panel.

That is, the present disclosure is also applicable to OLED display. In this case, the display switching device is formed on a light outgoing surface of a cover plate of the OLED.

It should be noted that, in the drawings of the present disclosure, the size, thickness, and the like of each structural layer are merely illustrative. In the process implementation, a projected area of each structural layer on a substrate can be changed and adjusted according to actual needs. The desired structural layers may be formed by an etching process; at the same time, the structures shown in the drawings do not limit the geometry of each structural layer which, for example, may be a rectangle as shown in the drawing, or may be a trapezoid, or other shape formed by etching.

Embodiments of the present disclosure further provide a display method using the display panel of the above embodiments, including the following steps S01 to S03.

S01 includes inputting display content to the display panel. In some embodiments, the display content includes image data and video data.

S02 includes determining format of the display content. In some embodiments, when images or videos are decoded, images or videos of different formats may be calibrated with different codes by encoding.

S03 includes controlling, based on a result of the determination, voltage signals applied to the electrode group and the common electrode, to control the electrochromic layer to present one of a transparent state for 2D display, a first pattern for auxiliary 3D display, or a second pattern for glasses-free 3D display.

Figure 11:
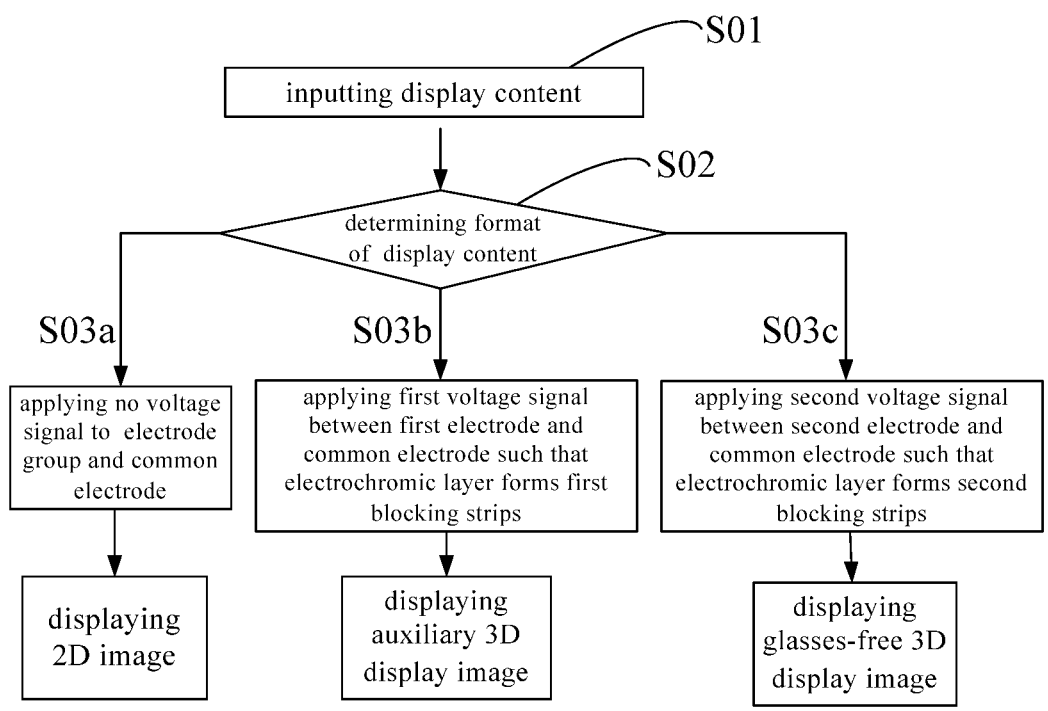
FIG. 11 is a flowchart of a display method according to an embodiment of the present disclosure.

In some embodiments, as shown in FIG. 11, step S03 may further include the following steps S03*a* to S03*c*.

At S03*a*, in a case that the display content is 2D display content, no voltage signal is applied between the electrode group 2 and the common electrode 1 such that the electrochromic layer 3 presents the transparent state, and the display panel displays a 2D image.

At S03*b*, in a case that the display content is auxiliary 3D display content, a first voltage signal is applied between the first electrode 21 and the common electrode 1 such that the electrochromic layer 3 forms blocking strips extending in the first direction to control a viewing angle of auxiliary 3D display, and the display panel displays an auxiliary 3D display image.

In one embodiment, as shown in FIG. 7, black lines, i.e., blocking strips extending in the first direction, appear at positions corresponding to horizontal portion of the black matrix. In this case, the blocking strips extending in the first direction function to enlarge the viewing angle.

At S03*c*, in a case that the display content is glasses-free 3D display content, a second voltage signal is applied between the second electrode 22 and the common electrode 1 such that the electrochromic layer 3 forms blocking strips extending in the second direction to control a viewing angle of glasses-free 3D display, and the display panel displays a glasses-free 3D display image.

Figure 8:
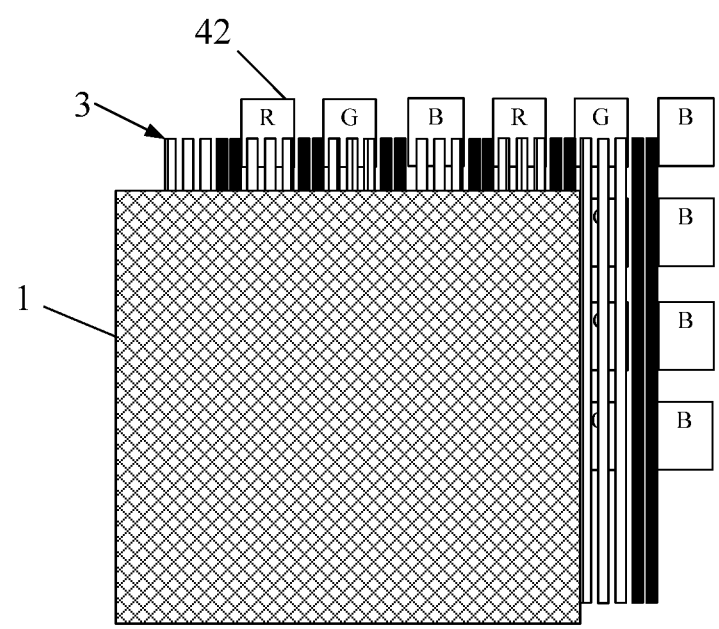

In one embodiment, as shown in FIG. 8, black lines, i.e., blocking strips extending in the second direction, appear at positions corresponding to the vertical portion of the black matrix. In this case, the blocking strips extending in the second direction function to present a glasses-free stereoscopic image.

In the embodiment of the present disclosure, the voltage signal between the electrode group 2 and the common electrode 1 depends on the display content input to the display panel, thereby implementing the corresponding switching function between 2D display, auxiliary 3D display, and glasses-free 3D display.

Embodiments of the present disclosure also provide a display device including any one of the above-described display panel assemblies. The display device may be any product or component having a display function, such as a liquid crystal display device, an electronic paper, an OLED display device, a mobile phone, a tablet computer, a television, a display, a notebook computer, a digital photo frame, a navigator, and the like.

It could be understood that the above embodiments are merely exemplary embodiments adopted for describing the principle of the present disclosure, but the present disclosure is not limited thereto. Various variations and improvements may be made by those of ordinary skill in the art without departing from the spirit and essence of the present disclo-

The invention claimed is:

1. A display panel assembly, comprising a display panel and a display switching device on a light outgoing surface of the display panel,
wherein the display switching device comprises an electrode group and an electrochromic layer; the electrode group comprises a first electrode and a second electrode;
the first electrode and the second electrode are configured to make the electrochromic layer present one of a transparent state for 2D display, a first pattern for auxiliary 3D display, or a second pattern for glasses-free 3D display; and
the display panel assembly further comprises a phrase retardation film, wherein the display switching device is on a light outgoing side of the phase retardation film.

2. The display panel assembly of claim 1, wherein the display panel assembly further comprises a common electrode, the electrochromic layer is between the electrode group and the common electrode, and the electrochromic layer is configured to:
present the transparent state to achieve 2D display in response to a first electric field between the electrode group and the common electrode;
present the first pattern to achieve auxiliary 3D display in response to a second electric field between the first electrode and the common electrode; and
present the second pattern to achieve glasses-free 3D display in response to a third electric field between the second electrode and the common electrode.

3. The display panel assembly of claim 2, wherein the first pattern comprises blocking strips extending in a first direction, and the second pattern comprises blocking strips extending in a second direction, the first direction intersecting the second direction.

4. The display panel assembly of claim 3, wherein the first electrode comprises a plurality of strip electrodes extending in the first direction, and the second electrode comprises a plurality of strip electrodes extending in the second direction.

5. The display panel assembly of claim 4, wherein the first direction is perpendicular to the second direction.

6. The display panel assembly of claim 5, wherein the display panel includes a color filter substrate, the display switching device is on a light outgoing surface of the color filter substrate, a black matrix is provided on a light incident surface of the color filter substrate, the black matrix comprises a black matrix extending in the first direction and a black matrix extending in the second direction, the black matrix extending in the first direction intersects the black matrix extending in the second direction, and the color filter substrate is provided with a color filter in a space defined by the black matrix.

7. The display panel assembly of claim 6, wherein the blocking strips extending in the first direction are in one-to-one correspondence with the black matrix extending in the first direction, and the blocking strips extending in the second direction are in one-to-one correspondence with the black matrix extending in the second direction.

8. The display panel assembly of claim 7, wherein a width of the blocking strips extending in the first direction is greater than a width of the black matrix extending in the first direction, and a width of the blocking strips extending in the second direction is greater than a width of the black matrix extending in the second direction.

9. The display panel assembly of claim 2, wherein the electrochromic layer is made of an electrochromic material,
the electrochromic material turns black in response to the second electric field between the first electrode and the common electrode, and
the electrochromic material turns black in response to the third electric field between the second electrode and the common electrode.

10. The display panel assembly of claim 1, wherein the display switching device comprises a first substrate and a second substrate, the first substrate comprises the first electrode, a first common electrode, and a first insulating layer between the first electrode and the first common electrode, the second substrate comprises the second electrode, a second common electrode, and a second insulating layer between the second electrode and the second common electrode, and the electrochromic layer is between the first substrate and the second substrate.

11. The display panel assembly of claim 10, wherein
in response to no electric field between the first substrate and the second substrate, the electrochromic layer presents the transparent state to achieve 2D display;
in response to a first electric field between the first electrode and the second common electrode, the electrochromic layer presents the first pattern to achieve auxiliary 3D display; and
in response to a second electric field between the second electrode and the first common electrode, the electrochromic layer presents the second pattern to achieve glasses-free 3D display.

12. The display panel assembly of claim 1, wherein the first electrode comprises a plurality of strip electrodes, the plurality of strip electrodes extend in a first direction and are closely arranged, the second electrode comprises a plurality of strip electrodes, the plurality of strip electrodes extend in a second direction and are closely arranged, and the electrochromic layer is between the first electrode and the second electrode.

13. The display panel assembly of claim 12, wherein
in response to a first electric field between the first electrode and the second electrode, the electrochromic layer presents the transparent state to achieve 2D display;
in response to a second electric field between the first electrode and the second electrode, the electrochromic layer presents the first pattern to achieve auxiliary 3D display; and
in response to a third electric field between the first electrode and the second electrode, the electrochromic layer presents the second pattern to achieve glasses-free 3D display.

14. The display panel assembly of claim 1, wherein the electrochromic layer is made of an electrochromic material.

15. The display panel assembly of claim 1, further comprising a polarizer, wherein the phase retardation film is on a side of the polarizer close to the display switching device.

16. The display panel assembly of claim 1, wherein an insulating layer is provided between the first electrode and the second electrode.

17. A display device comprising a display panel assembly, wherein the display panel assembly is the display panel assembly of claim 1.

* * * * *